Dec. 13, 1932.  G. A. LYON  1,891,192
ORNAMENTING RINGS FOR WHEEL RIMS
Filed March 7, 1932
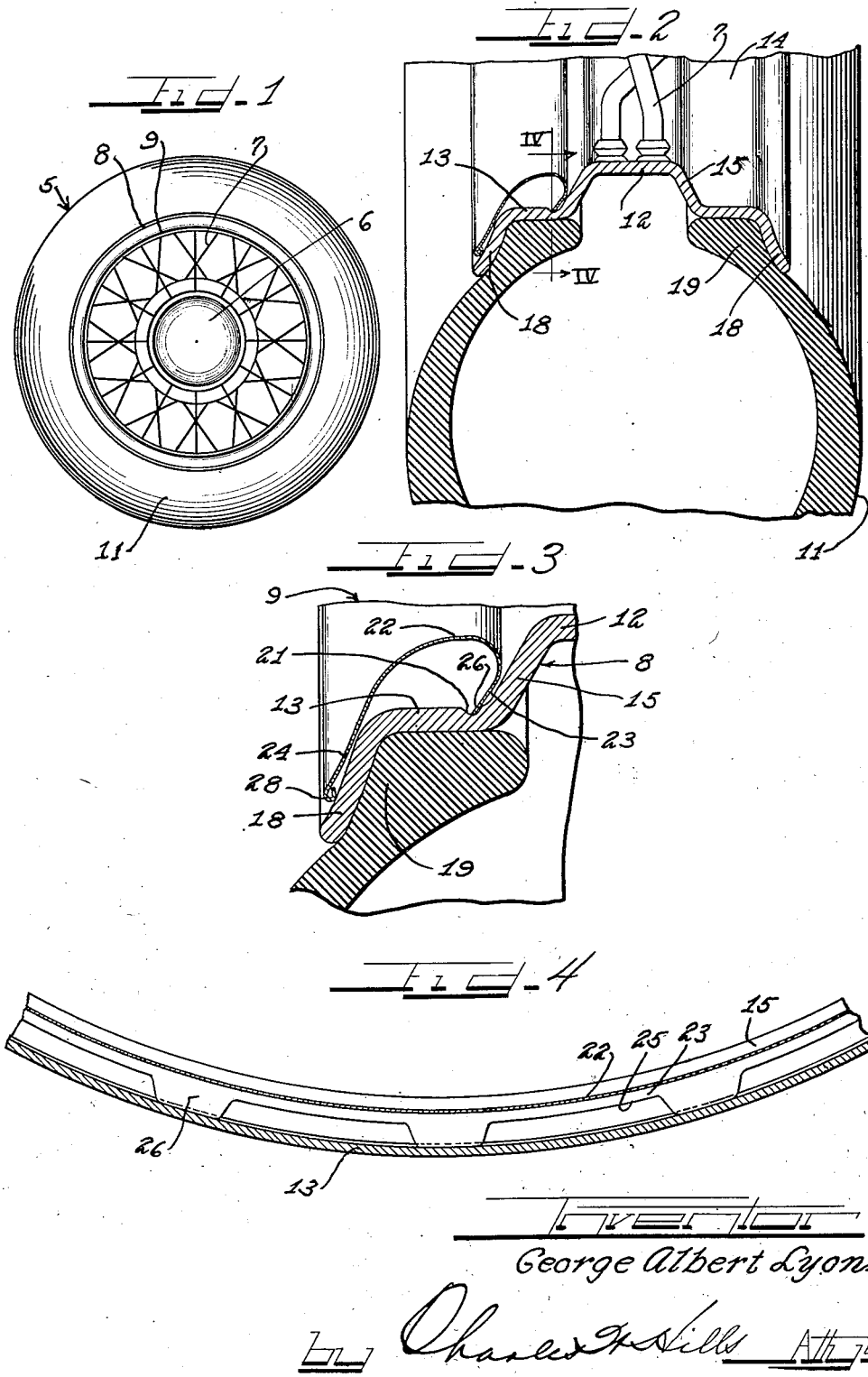
Inventor
George Albert Lyon Patented Dec. 13, 1932

1,891,192

UNITED STATES PATENT OFFICE

GEORGE ALBERT LYON, OF ALLENHURST, NEW JERSEY

ORNAMENTING RING FOR WHEEL RIMS

Application filed March 7, 1932. Serial No. 597,233. REISSUED

This invention relates to means for ornamenting the side flanges of the rims of automobile wheels. It will be described as embodied in an automobile wheel rim of the type used for wire wheels, but my invention is not limited to this form of wheel as it may be incorporated in any other form of automobile wheel rim.

It has been the practice heretofore to plate the flange of the automobile wheel rim which is normally disposed outwardly when in operation, but this has been found to be an expensive operation and one which is not permanent nor particularly desirable because it is readily affected by the grinding action of sand and stones thrown by the wheels and to such an extent that it becomes necessary to have the rims replated frequently to keep them in good condition.

An object of this invention is to overcome the disadvantages of the prior art above mentioned and to provide improved means for ornamenting wheel rims.

A further and more specific object of this invention is the provision of a replaceable ornamenting ring for wheel rims, which ring is of simplified construction, has a highly attractive appearance and may be quickly applied and secured in position.

Another object is the provision of such a ring in combination with a wheel rim, which ring when applied and secured in position automatically adjusts itself to ordinary variations in dimensions of rims of the same stock size.

On the drawing:

Figure 1 is a view in elevation showing an automobile wheel including a rim incorporating my invention.

Figure 2 is an enlarged cross sectional view of a fragment of the wheel rim and tire shown in Figure 1.

Figure 3 is a very much enlarged view of a fragment of that shown in Figure 2, and Figure 4 is a sectional view taken on the line IV—IV of Figure 2.

My invention as illustrated is incorporated in the rim of a wire wheel for an automobile. The wheel designated generally by numeral 5 comprises a hub 6, wire spokes 7, a rim 8 and an ornamenting continuous ring 9. The wheel as in operation is normally fitted with a tire 11 held in place by frictional engagement with the rim 8.

The rim 8 as illustrated comprises a central base portion 12 to which are suitably secured the spokes 7. The rim is also provided with offset base portions 13 and 14 which are in the form of shoulders spaced from the central base portion 12 by intermediate flanges 15 extending outwardly and inclined in opposite directions laterally from the central base portion. On the offset base portions or shoulders 13 and 14 are provided side tire engaging flanges 18 which are frictionally engaged by the bead portion 19 of the tire 11. The offset base 13 is provided with an annular recess 21 on its inwardly disposed surface adjacent the junction of the base 13 and the flange 15 for cooperation with the ornamenting ring for holding the same in position.

Applicant's improved ornamenting member for the wheel rim comprises a ring of relatively thin resilient material including an inwardly arched intermediate portion 22, which connects two marginal portions 23 and 24. The arched portion 22 serves to conceal the surface of the rim base 13. The marginal portion 23 is relatively short and has cut away portions 25 providing resilient or yieldable spaced feet or lugs 26 which are forced into the annular recess 21 in the base 13 for holding the ring 9 in position as best illustrated in Figure 3. The extension 23 extends outwardly or radially and is inclined laterally from the wheel in a direction substantially parallel to the major portion of the extension 24. The extension or marginal portion 24 is relatively long as compared with the marginal portion or extension 23 and passes downwardly or in a radial direction from the arched portion 22 and is inclined laterally in a direction away from the wheel to pass over the major portion of the marginal flange 18. The portion 24 is preferably provided at its extremity with a rolled or beaded portion 28 resiliently engaging the flange 18 and adapted to automatically adjust itself to the normal variations or irregularities of the wheel rim. The lugs or teeth 26 being resilient are adapted to accommodate themselves to any slight manufacturing irregularities on the surface or diameter of the rim base 13.

The ornamenting ring 9 may be formed of highly polished corrosive resisting material having the necessary inherent resiliency or it may be formed by heavily plated spring steel or such other material as may be found best suited for the specific purpose. From the foregoing description it will be readily understood that the ring 9 may be quickly applied to the wheel rim by simply pressing the same axially over the base portion 13 and thereby forcing the longitudinally spaced feet or lugs 26 into the annular groove 21. When the lugs 26 are pressed into the annular recess 21, the intermediate connecting arched portion 22 has been flexed a certain amount which is sufficient to yieldingly urge the bead 28 on the outer edge of the marginal portion 24 to very firmly and uniformly engage the surface of the tire engaging flange 18, adjacent the lower edge thereof in a manner to cover a very substantial portion of the flange and give a greatly improved appearance to the wheel rim as a whole. Although the ring 9 is of a relatively permanent nature it may be readily removed and replaced when desired simply by inserting a suitable tool between the flange 15 and the marginal portion 23 to force the lugs 26 from their position in the annular recess 21.

It will be appreciated by those skilled in the art that the preferred form of my invention as herein illustrated and described is susceptible of various changes and modifications without departing from the principle of the invention, and I do not therefore intend my invention to be limited in any manner except as required by the prior art.

I claim as my invention:

1. An automobile wheel rim including a base and side flanges, said base having an annular recess spaced inwardly from said side flanges and an annular ornamenting member partially concealing one of said flanges and including a plurality of spaced teeth seated in the recess in said base.

2. An automobile wheel rim including a central base, a flange on said central base, an offset base on said flange, a tire engaging flange on said offset base, an annular recess in said offset base and an ornamenting ring resiliently engaging said tire engaging flange and including marginal projections seated in the recess in said offset base.

3. An automobile wheel rim including a central base portion and an offset base portion, a tire engaging flange on said offset base portion, an intermediate flange between said offset base portion and said central base portion with an annular recess at the junction of said intermediate flange and said offset base portion, and an ornamenting ring including marginal portions partially concealing the flanges on said rim and an inwardly curved portion connecting said marginal portions, the outermost marginal portion concealing said tire engaging flange.

4. An automobile wheel rim including a central base, an annular shoulder spaced laterally from said central base, a tire engaging marginal flange on said shoulder, a recess in said shoulder, an ornamenting ring comprising two marginal portions extending substantially parallel, and an intermediate inwardly arched portion integrally connecting said marginal portions, said marginal portions engaging respectively said flange and said shoulder.

5. An automobile wheel rim including a base, a tire engaging marginal flange on said base, said base having a longitudinally extending recess, an ornamenting ring comprising outwardly extending marginal portions, and an inwardly arched portion connecting said marginal portions, one of said marginal portions engaging in the recess for holding said ring in position and the other portion overlying said marginal flange.

6. An automobile wheel rim including a base, a marginal flange on said base, said base having a longitudinally extending recess, an ornamenting ring comprising an inwardly arched intermediate portion and marginal portions engaging respectively said flange and said base, the marginal portion engaging said base being relatively short, and including longitudinally spaced lugs inclined outwardly and engaging in the recess in said base.

7. An automobile wheel rim including a base, a marginal flange on said base, said base having a longitudinally extending recess, an ornamenting ring comprising an inwardly arched intermediate portion and marginal portions engaging respectively said flange and said base, the marginal portion engaging said flange being relatively long and being inclined outwardly and laterally to conceal the greater part of said flange.

8. An automobile wheel rim including a base, a marginal flange on said base, said base having a longitudinally extending recess, an ornamenting ring comprising an inwardly arched intermediate portion and marginal portions engaging respectively said flange and said base, the marginal portion engaging said base being relatively short and the portion engaging said flange being relatively long, both of said portions extending outwardly and inclined laterally to conceal parts of said flange and said base.

9. An automobile wheel rim including a base, a marginal flange on said base, said base having a longitudinally extending recess, an ornamenting ring comprising an inwardly arched intermediate portion and marginal portions engaging respectively said flange and said base, said marginal portions being inclined laterally and extending outwardly in substantially the same direction, one of said portions including a beaded edge extending to a point on said flange adjacent the outer edge thereof, and the marginal portion engaging said flange being relatively long.

10. An automobile wheel rim including a base, a marginal flange on said base, said base having a longitudinally extending recess, an ornamenting ring comprising an inwardly arched intermediate portion and marginal portions engaging respectively said flange and said base, said marginal portions being inclined laterally and extending outwardly in substantially the same direction, one of said portions including a beaded edge extending to a point on said flange adjacent the outer edge thereof, and the marginal portion engaging said base including a plurality of spaced lugs forced into the recess in said base and held therein by the resiliency of the ring.

11. The combination with a wheel rim having a circular groove therein of an ornamental circular bead disposed over said groove so as to overlie the same and having an underturned toothed portion in engagement with said groove.

12. The combination with a wheel rim having a circular groove therein of an ornamental circular bead disposed over said groove so as to overlie the same and having an underturned portion in engagement with said groove, said underturned portion including a plurality of spaced resilient teeth adapted to be flexed into said groove to hold the bead on the rim.

13. The combination with a wheel rim of an ornamental continuous bead therefor of curved transverse cross section and held in tight cooperation with the rim solely by its engagement with the rim said bead including a normally concealed marginal portion including a plurality of projections for resiliently engaging said rim.

14. The combination with a wheel rim of an ornamental bead therefor of curved transverse cross section and held in tight cooperation with the rim solely by its engagement with the rim said bead including a normally concealed marginal portion for resiliently engaging said rim, said marginal portion including a plurality of spaced flexible teeth.

15. The combination with a wheel rim of an ornamental bead therefor of curved transverse cross section and held in tight cooperation with the rim solely by its engagement with the rim said bead including a normally concealed marginal portion for resiliently engaging said rim, said marginal portion including a plurality of spaced flexible teeth and said rim including a circular groove into which said teeth are adapted to be flexed to hold the bead on the rim.

16. The combination with a circular rim, of a circular ornamental bead therefor including a plurality of yieldable projections held in tight cooperation with said rim by their engagement with the rim.

17. The combination with a circular rim, of a circular ornamental continuous bead therefor including a plurality of yieldable projections held in tight cooperation with said rim by their engagement with the rim, and an arched portion of curved cross section connected to and disposed over said projections for concealing them.

18. An ornamental bead construction for a circular rim comprising a continuous circular bead having a flexible toothed portion of normally greated diameter than the surface of the rim to which it is to be applied, the teeth of said portion being deflectable with respect to said rim surface and being formed to apply pressure outwardly against said surface.

19. An ornamental bead construction for a circular rim comprising a continuous circular bead having a flexible toothed portion of normally greater diameter than the surface of the rim to which it is to be applied, the teeth of said portion being deflectable with respect to said rim surface and being formed to apply pressure outwardly against said surface, and an outer circular portion connected to said toothed portion for concealing the teeth thereof.

20. An ornamental bead construction for a circular rim comprising a continuous circular bead having a flexible toothed portion of normally greater diameter than the surface of the rim to which it is to be applied, the teeth of said portion being deflectable with respect to said rim surface and being formed to apply pressure outwardly against said surface, said toothed portion constituting the sole means for retaining the bead in proper position on said rim.

In testimony whereof I have hereunto subscribed my name at Asbury Park, Monmouth County, New Jersey.

GEORGE ALBERT LYON.